(12) United States Patent
Jodet et al.

(10) Patent No.: US 11,472,565 B2
(45) Date of Patent: Oct. 18, 2022

(54) TURBOMACHINE NACELLE HAVING ACOUSTICALLY POROUS WALLS

(71) Applicant: SAFRAN AIRCRAFT ENGINES, Paris (FR)

(72) Inventors: Norman Bruno André Jodet, Moissy-Cramayel (FR); Jérémy Paul Francisco Gonzalez, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 166 days.

(21) Appl. No.: 16/970,206

(22) PCT Filed: Feb. 19, 2019

(86) PCT No.: PCT/FR2019/050366
§ 371 (c)(1),
(2) Date: Aug. 14, 2020

(87) PCT Pub. No.: WO2019/158884
PCT Pub. Date: Aug. 22, 2019

(65) Prior Publication Data
US 2021/0122484 A1    Apr. 29, 2021

(30) Foreign Application Priority Data
Feb. 19, 2018   (FR) ..................................... 1851400

(51) Int. Cl.
*B64D 33/02* (2006.01)
*F02C 7/045* (2006.01)
(Continued)

(52) U.S. Cl.
CPC .............. *B64D 33/02* (2013.01); *F02C 7/045* (2013.01); *B64D 29/06* (2013.01);
(Continued)

(58) Field of Classification Search
None
See application file for complete search history.

(56) References Cited

U.S. PATENT DOCUMENTS 3,542,152 A * 11/1970 Oxx, Jr. .................... B32B 3/12
                                                   415/200
4,235,303 A * 11/1980 Dhoore .................. B64D 33/02
                                                   428/6
(Continued)

FOREIGN PATENT DOCUMENTS

EP    1 849 987 A2    10/2007
FR    2261583 A1      9/1975
(Continued)

OTHER PUBLICATIONS

International Search Report of PCT/FR2019/050366 dated May 23, 2019 [PCT/ISA/210].

*Primary Examiner* — Kayla Mccaffrey
(74) *Attorney, Agent, or Firm* — Sughrue Mion, PLLC

(57) ABSTRACT

A nacelle for a turbomachine is provided and includes an inner wall that is annular about a longitudinal axis of the nacelle, the annular inner wall being designed to surround part of the turbomachine. The nacelle further includes an annular outer wall surrounding the annular inner wall. The annular outer wall includes a first acoustically porous part, and the annular inner wall including a second acoustically porous part. The first and second porous parts are arranged facing one another so as to allow soundwaves, emitted by the turbomachine housed in the nacelle, to pass through the annular inner wall and then the annular outer wall so as to escape from the nacelle.

14 Claims, 6 Drawing Sheets

(51) Int. Cl.
  *B64D 29/06* (2006.01)
  *F02K 3/06* (2006.01)
(52) U.S. Cl.
  CPC ........... *B64D 2033/0206* (2013.01); *B64D 2033/0286* (2013.01); *F02K 3/06* (2013.01); *F05D 2220/323* (2013.01); *F05D 2260/96* (2013.01)

(56) References Cited

U.S. PATENT DOCUMENTS

| | | | | |
|---|---|---|---|---|
| 4,384,634 | A | * | 5/1983 | Shuttleworth .......... F02C 7/045 181/292 |
| 4,421,201 | A | * | 12/1983 | Nelsen .................... F02C 7/045 428/116 |
| 8,579,225 | B2 | * | 11/2013 | Mardjono ................. F02K 3/06 244/1 N |
| 8,733,688 | B2 | * | 5/2014 | Gantie .................... F02C 7/045 244/1 N |
| 2015/0267593 | A1 | * | 9/2015 | Lauder .................... F02C 7/045 409/143 |
| 2016/0257418 | A1 | * | 9/2016 | Caruel .................... B64D 15/04 |

FOREIGN PATENT DOCUMENTS

| | | | |
|---|---|---|---|
| FR | 2905734 | A1 | 3/2008 |
| FR | 2965859 | A1 | 4/2012 |
| FR | 2968048 | A1 | 6/2012 |
| FR | 2998267 | A1 | 5/2014 |

\* cited by examiner

TURBOMACHINE NACELLE HAVING ACOUSTICALLY POROUS WALLS

CROSS REFERENCE TO RELATED APPLICATIONS

This application is a National Stage of International Application No. PCT/FR2019/050366, filed Feb. 19, 2019, claiming priority to French Patent Application No. 1851400, filed Feb. 19, 2018, the entire contents of each of which are herein incorporated by reference in their entireties.

TECHNICAL FIELD OF THE INVENTION AND STATE OF THE ART

The invention belongs to the field of aircraft propulsion units, particularly to the field of aircraft turbomachine nacelles.

An important line of development for aircraft propulsion units is the reduction of engine noise, which can be defined as the noise generated by the aerodynamic elements of a turbojet engine during its operation. In particular, the solid rotating parts of the turbojet engine, such as the compressor rotors, the turbine rotors and the fan, produce pressure fluctuation signals which create acoustic waves. Solutions are sought to attenuate the engine noise experienced in particular by the passengers inside the cabin and by the persons on the ground under passage of the aircraft. A noise attenuation solution that has a limited impact on the mechanical bulk, the mass, the energy consumption and the efficiency of the propulsion unit, is sought.

A well-known solution for reducing the engine noise consists in attenuating the acoustic waves inside the nacelle. It is common practice to install, on the inner wall of the nacelle of a turbojet engine, "honeycomb" noise-cancelling panels, made of rigid metal sheets, perforated in a regular pattern. However, the effectiveness of such processing is optimized only for a relatively small frequency range and therefore does not correspond to all possible sources of engine noise. In addition, these honeycomb panels generate additional bulk within the internal space of the nacelle.

It has also been proposed to use the phenomena of destructive acoustic interference inside the nacelle, so that the acoustic waves causing the engine noise compensate each other. Patent application FR 2 998 267 in the name of the Applicant describes a technology derived from the already known concept of "HQ tube" (for Herschel-Quincke tube) which is a curved hollow tube constituting a parallel bypass for the air streams, in a duct in which an acoustic wave circulates such as the secondary duct. It is proposed, in this patent application, to install a device according to this principle in an air duct of a turbojet engine equipped with a honeycomb panel on its surface, the HQ tube opening at its two ends to the interior of the duct by passing through the honeycomb panel. An acoustic pressure fluctuation signal is thus taken from the duct and re-injected at another point, with a phase shift promoting destructive interferences between said signal and the non-phase shifted signal on which it is superimposed.

Patent application FR 2 968 048 in the name of the Applicant proposes a device for actively controlling the noise generated by the interaction between the wake of the fan and the outlet guide vanes (also called OGV). Piezo-electric actuators of small dimension are located on the OGVs, directly at the aerodynamic surfaces. These electro-static sources generate a sound signal that is preferably dipolar to be as similar as possible to the noise generated by the fans, this technology also being based on the principle of the destructive interferences. However, it can be difficult to reach the power level of the fan noise.

GENERAL PRESENTATION OF THE INVENTION

There is a need to attenuate the engine noise generated by the movable parts of an aircraft turbomachine, and in particular the noise perceived by the passengers in the cabin, and by the persons on the ground under passage of the aircraft.

There is, in particular, a need for a solution capable of limiting the acoustic energy radiated in all directions to the axial ends of the nacelle on its longitudinal axis, but which generates little additional bulk in the internal space of the nacelle.

The appended FIG. 1 schematically represents an aircraft viewed from the front. This aircraft includes a left wing 8 below which a turbomachine nacelle 1 is fixed, covering a turbomachine in operation. The turbomachine and the pylon for fixing the nacelle 1 to the wing 8 are not represented in the figure. The acoustic waves generated by the rotating parts of the turbomachine, particularly by the fan vanes whose direction of rotation is represented by the arrow R in the figure, propagate in the secondary duct formed between the turbomachine and the nacelle. The fan vanes are here in a downward direction of rotation on the side of the fuselage 9. The acoustic intensity streams created within the secondary duct are associated with a radiation of acoustic energy E. In the nacelles of the prior art such as the one represented in FIG. 1, this acoustic energy is radiated mainly to the ends of the nacelle, along directions that can be described in three components:

an axial component along the axis X of the nacelle, this direction of propagation not being represented, a radial component, not represented, an azimuthal component.

These three components correspond to the three dimensions of a cylindrical coordinate system relative to the longitudinal axis X, where the axial component along the axis X corresponds to the height in the cylindrical coordinates, the azimuthal component corresponds to the module, and the radial component corresponds to the radius.

FIG. 1 represents the direction of rotation of the fan of the turbomachine, and a plurality of preferred directions of propagation of the acoustic energy E contained in the azimuthal modes (modes existing inside the secondary duct) and of discharge of said energy into the ambient environment. The Applicant has observed that only some of these preferred directions of propagation (represented in solid line) correspond to an energy which participates in the engine noise likely to be perceived by the passengers in the cabin and/or by the persons on the ground. The other preferred directions of propagation (represented in dotted lines) do not contribute to the engine noise.

Thus, rather than to attenuate the acoustic energy within the nacelle, it is proposed to minimize the acoustic energy radiated towards the ground and towards the cabin, by releasing this energy in directions of propagation which are not detrimental to the acoustic comfort of the persons, including the azimuths represented in dotted lines in FIG. 1.

As such, the invention relates, according to a first aspect, to a nacelle for a turbomachine, the nacelle comprising an annular inner wall about a longitudinal axis of the nacelle, the annular inner wall being intended to surround at least partly a primary cowl of the turbomachine, the annular inner wall of the nacelle then forming with the primary cowl a secondary duct of the turbomachine, the annular inner wall delimiting the exterior of the secondary duct, the annular inner wall comprising a first acoustically porous part, the annular outer wall comprising a second acoustically porous part, the two acoustically porous parts facing each other to allow the passage through the annular inner wall, then through the annular outer wall, of acoustic waves emitted by the turbomachine received in the nacelle, and their discharge outside the nacelle.

In a nacelle according to the invention, the acoustic energy propagated within the secondary duct, due to the displacement of fluid by the rotating parts, is partially released not at the level of the axial ends of the nacelle, but through the acoustically porous parts formed in the walls of the nacelle.

One advantage of this solution is that it allows releasing the acoustic energy to the outside along preferential directions of propagation. The positioning of the acoustically porous parts can be judiciously chosen so that the acoustic energy is not released towards spaces where there are persons, the released acoustic energy then not participating in the engine noise.

Another advantage of this solution is that it is not bulky.

Additional and non-limiting characteristics of a nacelle of the invention are as follows, taken alone or in any one of their technically possible combinations:

- the two acoustically porous parts have the shape of a tube portion extending between a first axial position and a second axial position along the longitudinal axis of the nacelle, and extending between a first azimuthal position and a second position azimuthal about said longitudinal axis;
- at least one acoustically porous part comprises micro through-holes, evenly distributed within said part, said micro through-holes possibly being holes of dimensions smaller than 5 millimeters, preferably spaced by less than 10 millimeters;
- at least one of the annular walls of the nacelle is covered, at an acoustically porous part, with a permeable layer for the acoustic waves, preferably a woven wire mesh.

The nacelle having such an additional permeable layer at the acoustically porous parts has an additional advantage, in that the aerodynamic flow is not disturbed in the vicinity of the porous parts, which improves the aerodynamic performances of the propulsion unit.

According to a second aspect, the invention relates to an assembly comprising a nacelle as defined above and a turbomachine partially or totally comprised inside the nacelle.

According to another aspect, the invention aims an aircraft comprising a nacelle as defined above. The nacelle can for example be located above or below a wing of the aircraft.

Advantageously and without limitation for the scope of the invention, said aircraft may have the following characteristics, taken alone or in any one of their possible combinations:

- the aircraft comprises a nacelle in which the first and second azimuthal positions which delimit the acoustically porous parts are defined so that the acoustic waves are released in an area located between a first plane and a second plane, the first plane being parallel to the longitudinal axis of the nacelle and tangent to the fuselage of the aircraft and to the nacelle, the second plane being tangent to the nacelle and substantially horizontal;
- the nacelle is provided to receive a turbomachine which direction of rotation of the fan vanes is descending on the side of the fuselage, the first and second azimuthal positions θ1 and θ2 being defined by the following system of equations:

$$\frac{D_F}{2} - \frac{D_M}{2} - X_M \cos\theta_1 - Y_M \sin\theta_1 = 0$$

$$(X_{SL} - X_M)\cos\theta_2 + (Y_{SL} - Y_M)\sin\theta_2 + \frac{D_M}{2} = 0$$

where $X_M$ and $Y_M$ correspond respectively to the abscissa and to the ordinate of the center of the nacelle in the same three-dimensional reference frame whose center is located on the longitudinal axis of the fuselage, where $X_{SL}$ and $Y_{SL}$ correspond respectively to the abscissa and to the ordinate of the Sideline noise certification point in said three-dimensional reference frame, and where $D_F$ and $D_M$ are respective maximum diameters of the outer surfaces of the fuselage and of the engine;

- the nacelle is provided to receive a turbomachine which direction of rotation of the fan vanes is ascending on the side of the fuselage, the first and second azimuthal positions θ1 and θ2 being defined by the following system of equations:

$$-\frac{D_F}{2} - \frac{D_M}{2} + X_M COS\psi_1 + Y_M \sin\psi_1 = 0$$

$$\theta_1 = \psi_1 + 180°$$

$$(X_{SL} - X_M)\cos\psi_2 + (Y_{SL} - Y_M)\sin\psi_2 - \frac{D_M}{2} = 0$$

$$\theta_2 = \psi_2 + 180°$$

where $X_M$ and $Y_M$ correspond respectively to the abscissa and to the ordinate of the center of the nacelle in the same three-dimensional reference frame whose center is located on the longitudinal axis of the fuselage, where $X_{SL}$ and $Y_{SL}$ correspond respectively to the abscissa and to the ordinate of the Sideline noise certification point in said three-dimensional reference frame, and where $D_F$ and $D_M$ are respective maximum diameters of the outer surfaces of the fuselage and of the engine;

- the first axial position is located at the lip of the nacelle, and the second axial position is aligned with the leading edge of the wing;
- the first axial position is aligned with the trailing edge of the wing, and the second axial position is located at the downstream end of the nacelle.

GENERAL PRESENTATION OF THE FIGURES

Other characteristics, aims and advantages of the invention will emerge from the following description, which is purely illustrative and not limiting, accompanied by FIG. 1 already described above and by the following other appended drawings, among which:

FIG. 2 represents a part of a turbomachine nacelle fixed to an aircraft wing and viewed in longitudinal section;

FIG. 3 schematically represents the interior of a nacelle according to one embodiment of the invention;

DETAILED DESCRIPTION OF EMBODIMENTS

Figure 1:
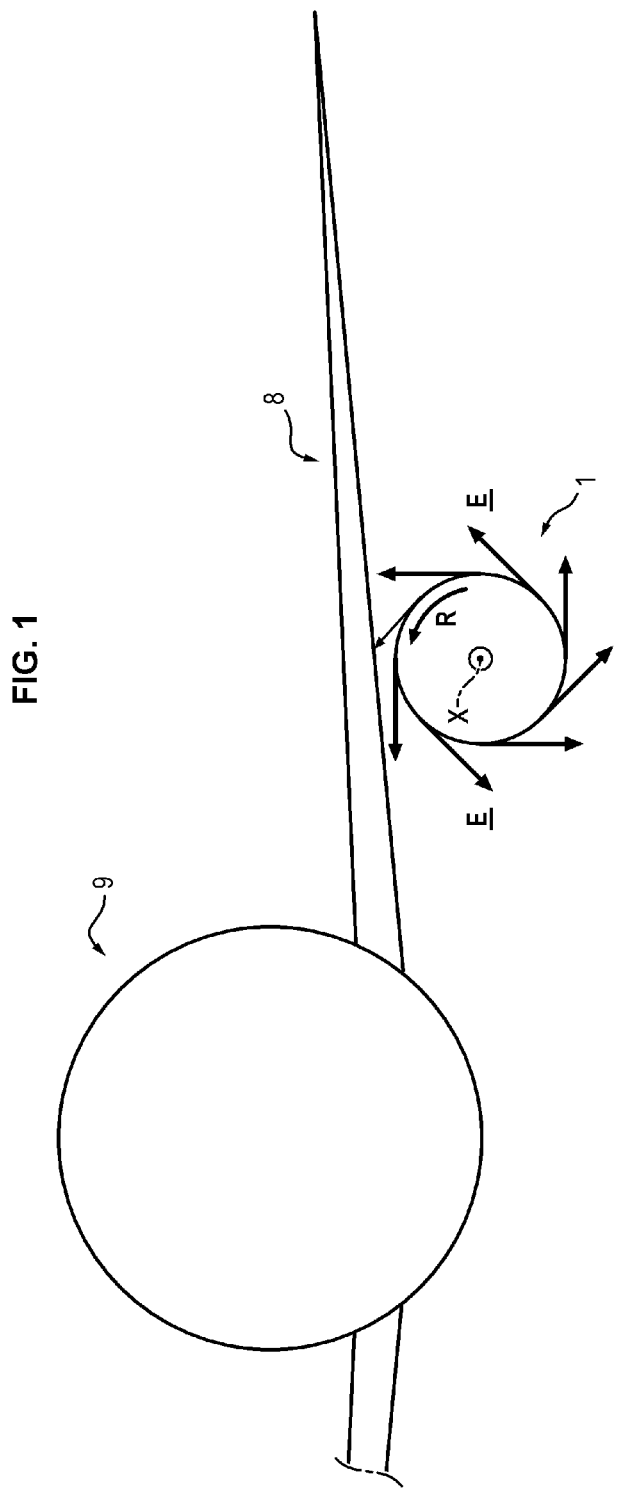

In what follows, similar elements in the figures will be designated by the same reference numerals. Furthermore, a turbomachine of the turbofan engine type will be described below, but the invention could be applied with the same advantages to other types of propulsion units.

Figure 2:
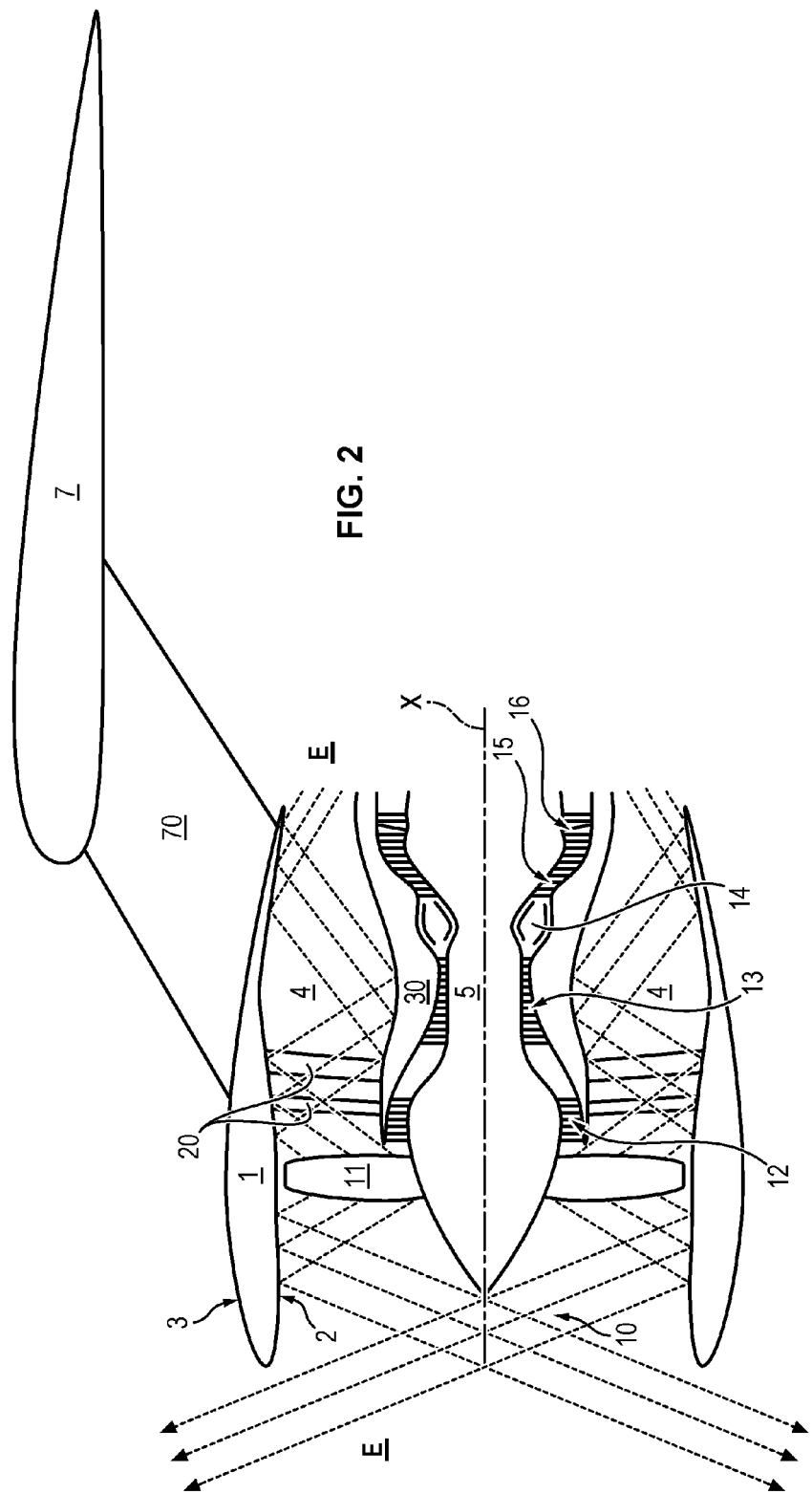

FIG. 2 represents a nacelle 1 containing a turbofan engine, viewed in longitudinal section along the longitudinal axis X of the turbojet engine. The nacelle 1 does not comprise the acoustically porous parts which will be described below in relation to the following figures.

The nacelle 1 comprises an annular inner wall 2 and an annular outer wall 3. The two said walls are centered on the longitudinal axis X of the turbomachine which is also a longitudinal axis of the nacelle.

The annular inner wall 2 partially covers the turbojet engine, and forms together with the primary cowl 30 a secondary duct 4 allowing the passage of the secondary stream when the turbojet engine is in operation. Acoustic waves can propagate within this secondary duct, generated by the pressure fluctuations of the medium and in particular by the displacement of fluid driven by the rotating elements. The propulsion unit further comprises, from upstream to downstream, the following elements: an air inlet 10, a fan 11, and inside the primary cowl 30 which delimits a primary duct: a low-pressure compressor 12, a high-pressure compressor 13, a combustion chamber 14, a high-pressure turbine 15, a low-pressure turbine 16. Furthermore, the turbojet engine 3 also comprises other elements downstream of the low-pressure turbine which are not represented in the figure. FIG. 2, in particular a nozzle guiding the air outlet. The annular inner wall 2 of the nacelle is connected to the primary cowl 30 by link arms 20, extending radially relative to the axis X from the primary cowl 30.

The nacelle 1 is here represented fixed to an aircraft wing 7 which extends parallel to the longitudinal axis X of the turbojet engine. The nacelle is fixed to the wing by means of a pylon 70, through which the section plane passes.

Several paths of propagation of the acoustic energy E within the secondary duct of the nacelle have been represented in FIG. 2. When the acoustic energy E is radiated towards the ends of the nacelle 1, this energy is (in the absence of other obstacle) likely to propagate out of the nacelle along any radial and azimuthal direction. In particular, as seen in FIG. 2, this energy can be propagated up to the ground, or be propagated in a direction perpendicular to the section plane of FIG. 2 and reach the cabin of the aircraft.

In these last two cases, the acoustic energy E is a source of engine noise, even if it can be partially absorbed before being perceived by the individuals.

Figure 3:
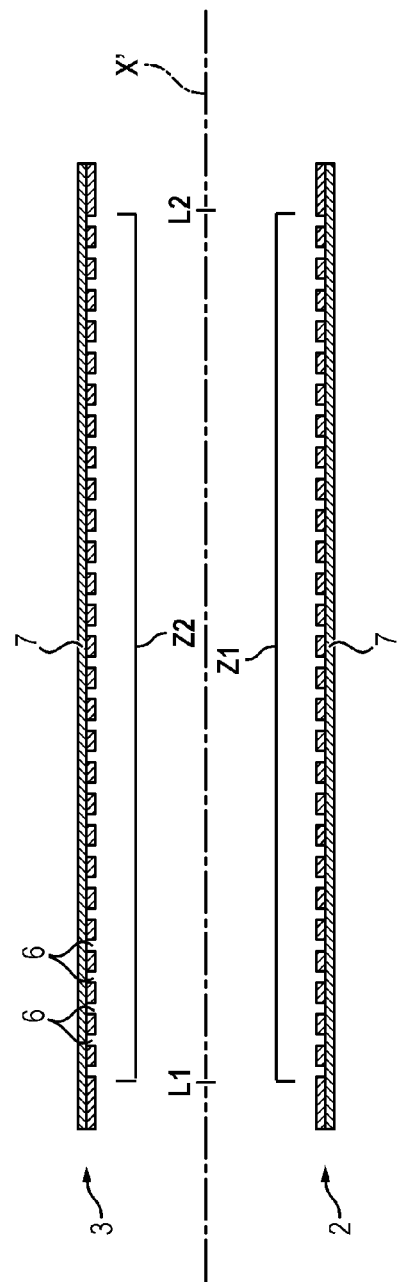

FIG. 3 represents a schematic longitudinal sectional view of the interior of a nacelle comprising acoustically porous parts on its annular inner wall 2 and on its annular outer wall 3, according to one possible embodiment. The central longitudinal axis X of the nacelle, along which a turbomachine extends when it is housed in the nacelle, is not represented in FIG. 3 and would be located at the bottom of this figure. An axis X' parallel to said axis X has been represented.

The annular inner wall 2 comprises a first acoustically porous part Z1 which extends between an axial position L1 and an axial position L2. By "acoustically porous part" is meant that the part Z1 has a structure which allows acoustic waves to pass through the wall 2 at the part Z1. In other words, the interior of the nacelle (delimited by the walls 2 and 3) and the area located at the bottom of the wall 2 are in acoustic communication. Furthermore, in this example, the acoustically porous part Z1 also has a certain width along the azimuthal direction—this width not being visible in FIG. 3. The part Z1 extends about the central axis X of the nacelle, along the annular inner wall 2, between a first azimuth θ1 and a second azimuth θ2. In other words, the part Z1 extends between the plane passing through the axis X of azimuth θ1 and the plane passing through the axis X of azimuth θ2. The area Z1 therefore has the shape of a tube portion, sandwiched on the tube formed by the annular wall 2 extending between the axial positions L1 and L2, the tube portion being sandwiched between the azimuths θ1 and θ2.

Furthermore, the annular outer wall 3 has a second acoustically porous part Z2. This part Z2 puts in acoustic communication the interior of the nacelle and the environment external to the nacelle.

Importantly, the acoustically porous parts Z1 and Z2 are positioned facing each other, so as to allow the passage of an acoustic wave from the space inside the annular inner wall 2, capable of receiving a turbomachine, to the environment external to the nacelle. To allow this acoustic wave passage, the parts Z1 and Z2 are at least partially aligned.

By alignment is meant that a wave propagating along a radial direction relative to the longitudinal axis X of the nacelle can pass through the part Z1 of the annular inner wall 2, then through the part Z2 of the annular outer wall 3.

In the example represented in FIG. 3, and advantageously, the acoustically porous parts Z1 and Z2 extend over the same axial positions (between L1 and L2) and on the same azimuthal positions (between θ1 and θ2, these azimuthal positions being not represented here). They are therefore totally aligned radially.

For making the acoustically porous parts Z1 and Z2, in the example of FIG. 3, the walls 2 and 3 which delimit the nacelle have through micro-perforations 6 at the parts Z1 and Z2. In this example, the micro-perforations are evenly distributed throughout the surface of the parts Z1 and Z2. These micro-perforations give the walls 2 and 3 their acoustically porous nature at the parts Z1 and Z2. The micro-perforations 6 are here holes of dimensions smaller than 5 millimeters, for example circular holes of a diameter comprised between 1 and 5 millimeters. The holes 6 are here spaced two by two by less than 10 millimeters. However, other forms of perforation, and other types of structure making the walls 2 and 3 locally acoustically porous, could be considered.

The existence of perforated parts along the fluid flows in the propulsion unit formed by the nacelle and a turbomachine—in particular for the annular inner wall 2 which delimits, when a turbomachine is received within the nacelle, the secondary duct—may disturb the aerodynamics of these fluid flows. It is important to minimize these disturbances, with a view to preserving proper aerodynamic efficiency of the propulsion unit. Advantageously, the perforated parts Z1 and Z2 are therefore covered by an additional layer 7, as represented in FIG. 3. One effect of the layer 7 is to minimize the aerodynamic disturbances in the vicinity of the parts Z1 and Z2, to minimize for example the air loss at the secondary stream.

The layer 7 is formed of a material having significant porosity to the acoustic waves. For example, the layer 7 is formed of a lattice-like woven wire mesh. The woven wire mesh is formed of a meshing of metal wires. The spacing between the metal wires of the meshing is chosen so as to reveal perforations of the underlying porous parts.

In general, the smaller the spacing between the metal wires, the more a fluid flow passing through the layer 7 undergoes pressure drops, due to the friction forces of the fluid on the metal wires of the layer 7. In addition, the greater the thickness (along a direction orthogonal to the longitudinal axis of the nacelle) of the layer 7, the more a fluid flow passing through the layer 7 undergoes pressure drops.

The greater the pressure drops upon passage through the layer 7, the lower the fluid flow rate passing through the layer 7. With sufficient pressure drops, it is possible to reach zero through flow rate.

The through nature of the fluid flow relative to the layer 7 also depends on the orientation of the velocity vector of the fluid flow, at the interface between the layer 7 and the fluid flow. The higher the standard of the component normal to the layer 7 of this velocity vector, the more the fluid flow tends to pass through the layer 7.

An advantage of obtaining a reduced or zero through flow rate at the layer 7—in particular by modulating the spacing of the wires constituting the lattice and the total thickness of the layer—is to make the perforated parts of the nacelle impermeable with respect to the aerodynamic flow, while preserving the permeability to the acoustic waves for said perforated parts.

As an alternative, a layer 7 can be made only on one of the two perforated parts Z1 or Z2 of the nacelle walls, and can be made only on a portion of said part.

The nacelle portion comprising the acoustically porous parts Z1 and Z2 here extends on axial positions (between L1 and L2) where the annular inner wall 2 and the annular outer wall 3 are substantially parallel; however, the acoustically porous parts could be positioned in a nacelle portion where the distance between the walls 2 and 3 is variable. The acoustically porous parts can be positioned in a nacelle portion which comprises elements of the propulsion unit between the walls 2 and 3; in the latter case, it is advantageous to provide that these elements are designed to allow the acoustic waves to pass. For example, if a duct is interposed between the walls 2 and 3, it is advantageous that this duct also comprises micro-perforations facing the porous parts Z1 and Z2.

Figure 4:
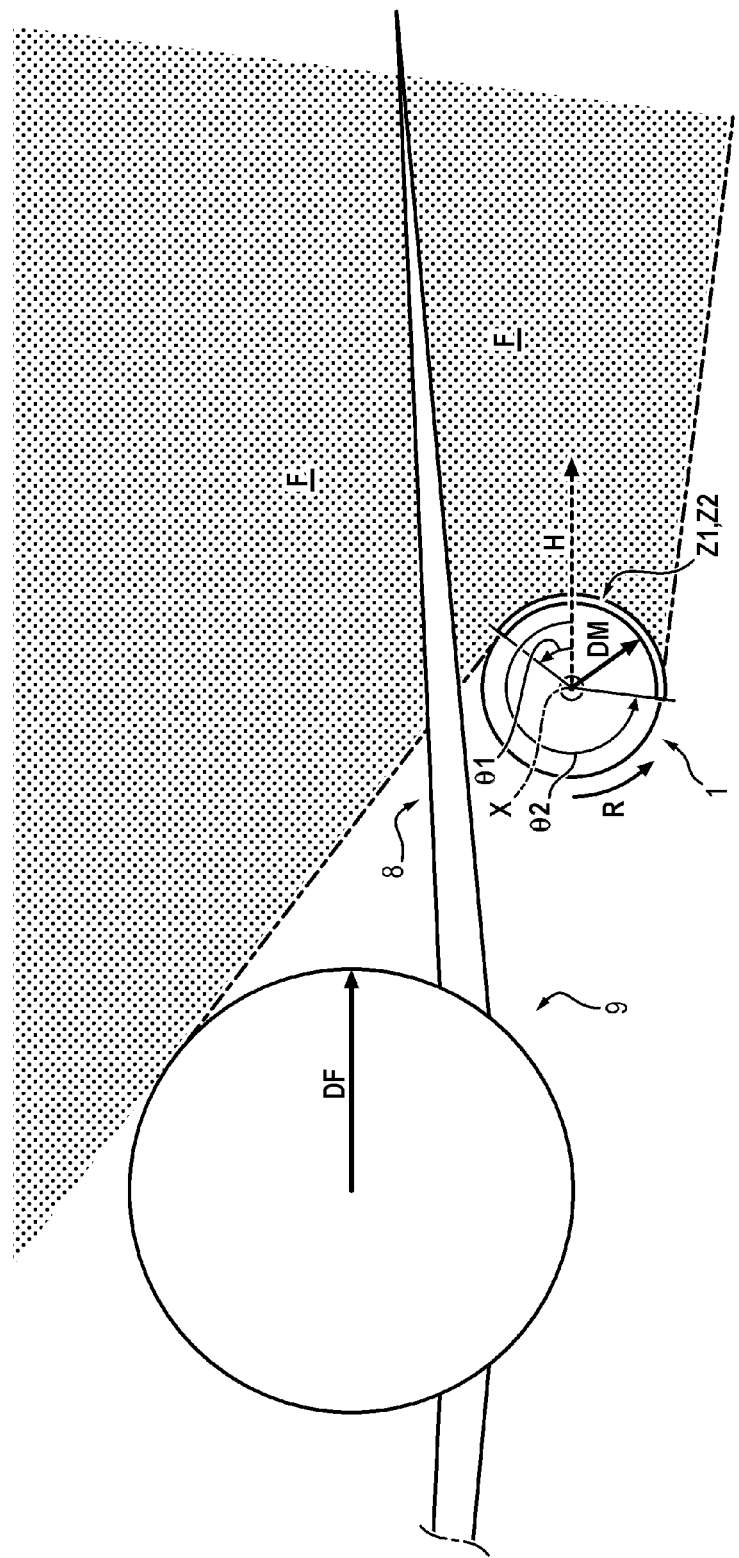
FIG. 4 represents an aircraft viewed from the front equipped with a nacelle of the invention according to a possible positioning.
Figure 5:
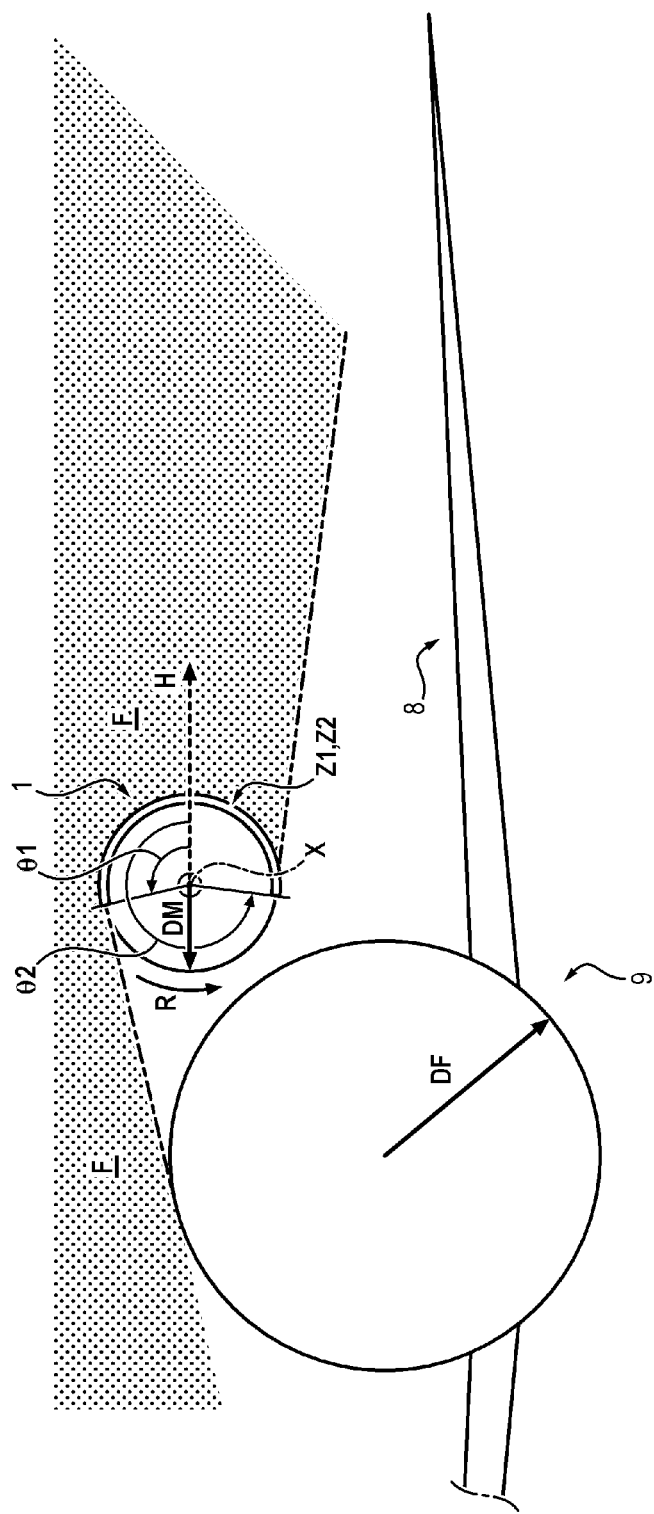
FIG. 5 represents an aircraft viewed from the front equipped with a nacelle of the invention according to another possible positioning.
Figure 6:
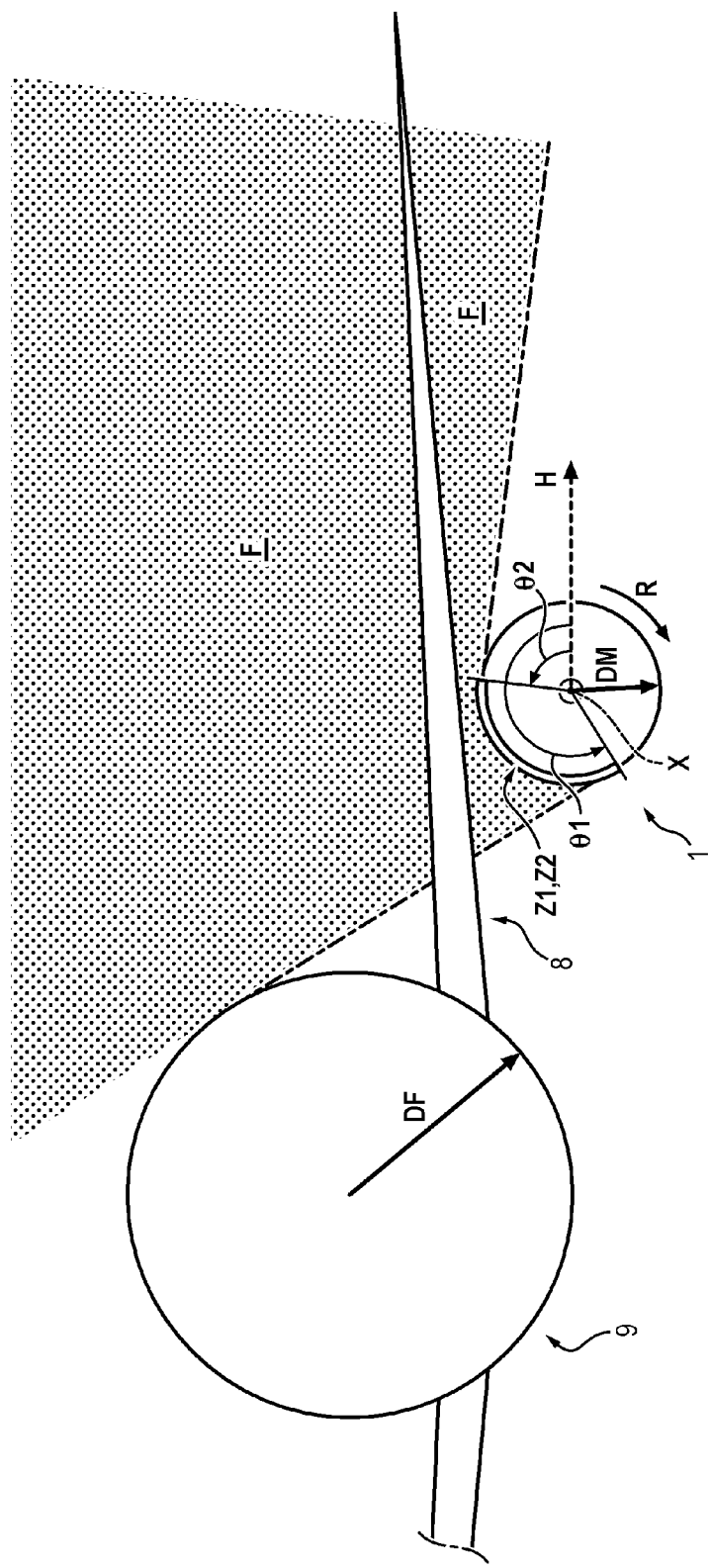
FIG. 6 represents an aircraft viewed from the front equipped with a nacelle of the invention according to a third possible positioning.

FIGS. 4, 5 and 6 represent several embodiments for an aircraft with a propulsion unit including a nacelle 1 with partially acoustically porous walls. In these figures, the aircraft is viewed from the front along a direction parallel to the longitudinal axis of the nacelle and of the fuselage. In these embodiments, said nacelle is fixed below the left wing, or above the left wing.

In all these embodiments, the nacelle 1 has at its annular inner wall a first acoustically porous part Z1 in the form of a tube portion, extending between a first axial position L1 along the longitudinal axis X of the nacelle and a second axial position L2, and extending throughout the perimeter of the nacelle except between a first azimuthal position θ1 and a second azimuthal position θ2. The nacelle also has, at its annular outer wall which surrounds the annular inner wall, a second acoustically porous part Z2 in the form of a tube portion, extending between the same axial positions L1 and L2, and extending throughout the perimeter of the nacelle except between the same azimuthal positions θ1 and θ2. For making the two acoustically porous parts, the nacelle may for example have evenly distributed micro-perforations as described above in relation to FIG. 3. In any of the embodiments described below, one of the two acoustically porous parts Z1 and Z2, or the two said porous parts, are preferably covered with a layer 7 of woven wire mesh as defined above. The two inner and outer walls of the nacelle have not been represented separately in FIGS. 4, 5 and 6; a single annular nacelle wall has been represented, the acoustically porous parts Z1 and Z2 being represented by the same arc of a circle in thick lines.

FIG. 4 relates to a first embodiment where the nacelle 1 is positioned under the low surface of the left wing 8, and where the fan of the turbomachine (not represented here) received in the nacelle presents in the phases of cruising speed a direction of rotation according to the arrow R. The fan vanes are descending on the side of the fuselage 9. By fuselage is meant the main body of the aircraft which comprises in particular a nose cone, a central box with the cabin intended to receive passengers, and a tail cone.

The azimuthal positioning (positions θ1 and θ2, marked relative to a horizontal axis H parallel to the ground) of the acoustically porous parts Z1 and Z2 of the nacelle 1 is calculated as a function in particular of the positioning of the nacelle 1 relative to the fuselage 9, and as a function of the Sideline noise certification position. The Sideline position concerns the propagation of the engine noise towards the persons present on the ground. Said position is set by the regulations relating to the international air transportation, in particular by the ICAO (International Civil Aviation Organization); the farther this Sideline position on the sides of the aircraft, the more it is sought to limit the radiation of acoustic energy towards the ground.

In general, the azimuthal positions θ1 and θ2 are defined so that the acoustic waves are released in a preferential area F, where it is considered that the released acoustic energy is not very harmful and does not participate in the engine noise perceived by the passengers or by the persons on the ground.

The area F is located between a first plane and a second plane, the first plane being parallel to the longitudinal axis X of the nacelle 1 and tangent to the fuselage 9 of the aircraft and to the nacelle 1, the second plane being tangent to the low part of the nacelle 1 and being substantially horizontal. The horizontal is marked relative to the ground when the aircraft is on the ground.

In the embodiment represented in FIG. 4, where the fan vanes rotate in a downward direction on the side of the fuselage 9, the azimuthal positions θ1 and θ2 are defined by the following system of equations:

$$\frac{D_F}{2} - \frac{D_M}{2} - X_M \cos\theta_1 - Y_M \sin\theta_1 = 0$$

$$(X_{SL} - X_M)\cos\theta_2 + (Y_{SL} - Y_M)\sin\theta_2 + \frac{D_M}{2} = 0$$

where $X_M$ and $Y_M$ correspond respectively to the abscissa and to the ordinate of the center of the nacelle 1 (this center being located on the longitudinal axis X), in a three-dimensional reference frame whose center is located on the axis of the fuselage, where $X_{SL}$ and $Y_{SL}$ correspond respectively to the abscissa and to the ordinate of the Sideline noise certification point in said three-dimensional reference frame, and where $D_F$ and $D_M$ are the respective maximum diameters of the outer surfaces of the fuselage and of the nacelle, here the maximum diameters respectively for the projections of the fuselage 9 and of the nacelle 1 along a direction parallel to the axis X.

Examples of Sideline position point coordinates, as defined above, in said three-dimensional reference frame are the following: an abscissa $X_{SL}$ of 450.0 m (regulatory lateral distance between said point and the aircraft), an ordinate $Y_{SL}$ of 304.8 m (value close to 1,000 feet, altitude of the aircraft very close to the altitude corresponding to a maximum aircraft noise measured at the Sideline point).

Moreover, in this embodiment, the angle θ1 (marked from the horizontal axis H) can be for example 45 degrees, and the angle θ2 can be 260 degrees.

With the direction chosen in FIGS. 4, 5 and 6, the acoustically porous parts Z1 and Z2 extend from the azimuth θ2 to the azimuth θ1, in other words, throughout the perimeter of the nacelle except on the portion from the azimuth θ1 to the azimuth θ2.

The boundary of the porous parts Z1 and Z2 at the azimuth θ1 makes it possible to limit the radiation of acoustic energy towards the cabin; at the boundary θ1, the perfectly azimuthal direction of propagation is tangent to the high part of the fuselage 9, and does not cross the interior of the fuselage.

The boundary of the porous parts Z1 and Z2 at the azimuth θ2 makes it possible to authorize the propagation of the acoustic waves exiting the low part of the nacelle only in directions close to the horizontal; thus, these acoustic waves do not reach the part of the ground below the aircraft. These acoustic waves travel a long way along their direction of propagation before reaching the ground, and are therefore largely attenuated by the atmosphere before reaching the ground. These waves contribute very little to the aircraft noise.

FIG. 5 relates to a second embodiment, where the nacelle 1 is positioned above the high surface of the left wing 8.

As in the embodiment of FIG. 4, the fan received in the nacelle presents, in the phases of cruising speed, a direction of rotation according to the arrow R, the fan vanes descending on the side of the fuselage 9.

Here, the azimuthal positions θ1 and θ2 are determined by the resolution of the following system of equations, which is the same as for the embodiment illustrated in FIG. 4:

$$\frac{D_F}{2} - \frac{D_M}{2} - X_M \cos\theta_1 - Y_M \sin\theta_1 = 0$$

$$(X_{SL} - X_M)\cos\theta_2 + (Y_{SL} - Y_M)\sin\theta_2 + \frac{D_M}{2} = 0$$

The azimuthal positions θ1 and θ2 are interpreted in the same way as above; the preferential area F of propagation of the acoustic waves exiting the nacelle 1 comprises neither the cabin of the aircraft, nor an area of the ground where said waves are likely to contribute significantly to the aircraft noise.

FIG. 6 illustrates a third embodiment, where the nacelle 1 is positioned below the low surface of the left wing 8.

Unlike the embodiments described above, the fan received in the nacelle has, in the phases of cruising speed, a direction of rotation according to the arrow R with fan vanes descending on the side opposite the fuselage 9. With this direction of rotation of the fan, the planes which limit the area F of propagation of the acoustic waves through the porous parts Z1 and Z2 are defined in a different way. The first and second azimuthal positions θ1 and θ2 are defined by the following system of equations:

$$-\frac{D_F}{2} - \frac{D_M}{2} + X_M \cos\psi_1 + Y_M \sin\psi_1 = 0$$

$$\theta_1 = \psi_1 + 180°$$

$$(X_{SL} - X_M)\cos\psi_2 + (Y_{SL} - Y_M)\sin\psi_2 - \frac{D_M}{2} = 0$$

$$\theta_2 = \psi_2 + 180°$$

The values $X_M$, $Y_M$, $X_{SL}$, $Y_{SL}$, $D_M$ and $D_F$ are defined in the same way as above.

In this embodiment, the acoustically porous parts Z1 and Z2 of the nacelle walls are located on a high part of the nacelle; indeed, the direction of rotation of the fan (ascending on the side of the fuselage) promotes a propagation away from the fuselage for the acoustic waves exiting the nacelle and passing through the porous parts Z1 and Z2.

By way of example, in this embodiment, the angle θ1 can be 170 degrees and the angle θ2 can be 80 degrees.

Regarding the axial positioning of the porous parts of the nacelle walls (limited upstream by the position L1 and downstream by the position L2), this axial positioning is advantageously made as a function of the position of the nacelle 1 relative to the wing 8.

According to a preferred embodiment, which can be made in combination with any one of the embodiments of FIGS. 4, 5 and 6, if the nacelle is positioned upstream of the wing (the lip of the nacelle protruding from the leading edge of the wing), the position L1 corresponds to the lip of the nacelle and the position L2 corresponds to the vertical projection onto the nacelle from the leading edge of the wing; if the nacelle is positioned downstream of the wing (the downstream end of the nacelle protruding from the trailing edge of the wing), the position L1 corresponds to the vertical projection onto the nacelle of said trailing edge, and the position L2 corresponds to the downstream end of the nacelle.

These axial positions are advantageous in that they prevent acoustic waves passing through the porous parts Z1 and Z2 from being reflected by the low or high surfaces of the wing, in which case their directions of propagation are no longer controlled. If the nacelle is not adjacent to an acoustically reflective element of the aircraft such as the wing, a wider range of axial positions can be considered.

It should be noted that the settings described above are not limiting, and constitute only possible embodiments. Other settings for the positioning of the acoustically porous parts of the nacelle walls could be considered. Furthermore, the nacelle could have several distinct porous parts along the perimeter of the nacelle, so as to minimize the unwanted reflections and so as to influence more accurately the directions of propagation of the acoustic waves exiting the nacelle.

The invention claimed is:

1. A nacelle for a turbomachine, the nacelle comprising:
    an annular inner wall about a longitudinal axis of the nacelle, the annular inner wall being arranged around a primary cowl of the turbomachine, such that the annular inner wall of the nacelle forms with the primary cowl a secondary duct of the turbomachine, the annular inner wall delimiting the exterior of the secondary duct, an annular outer wall surrounding the annular inner wall, the annular outer wall being configured to be in contact with the exterior environment of the nacelle, wherein the annular inner wall comprises a first acoustically porous part, the annular outer wall comprising a second acoustically porous part, the first and second acoustically porous parts face each other to allow the passage through the annular inner wall, then through the annular outer wall of acoustic waves emitted by the turbomachine received in the nacelle, and their discharge outside the nacelle.

2. The nacelle according to claim 1, wherein the first and second acoustically porous parts extend along a portion of the annular inner wall and the annular outer wall, respectively, such that the first and second acoustically porous parts extend between the same first axial position and the same second axial position along the longitudinal axis of the nacelle; and extend between the same first azimuthal position and the same second azimuthal position about said longitudinal axis.

3. The nacelle according to claim 1, wherein at least one of the first and second acoustically porous parts comprises micro through-holes, evenly distributed within said acoustically porous part.

4. The nacelle according to claim 3, wherein the micro through-holes are holes of dimensions smaller than 5 millimeters.

5. The nacelle according to claim 4, wherein the micro through-holes are spaced apart by less than 10 millimeters.

6. The nacelle according to claim 1, wherein at least one of the annular walls of the nacelle is covered, at one of the first and second acoustically porous parts, with a permeable layer for the acoustic waves.

7. The nacelle according to claim 6, wherein the permeable layer comprises a woven wire mesh.

8. An assembly comprising the nacelle according to claim 1 and the turbomachine inside the nacelle.

9. An aircraft comprising the nacelle for the turbomachine according to claim 1.

10. The aircraft according to claim 9, wherein the first and second acoustically porous parts extend along a portion of the annular inner wall and the annular outer wall, respectively, such that the first and second acoustically porous parts extend between the same first axial position and the same second axial position along the longitudinal axis of the nacelle and extend between the same first azimuthal position and the same second azimuthal position about said longitudinal axis, and wherein the first and second azimuthal positions are defined so that the acoustic waves are released in an area located between a first plane and a second plane, the first plane being parallel to the longitudinal axis of the nacelle and tangent to the fuselage of the aircraft and to the nacelle, and the second plane being tangent to the nacelle and substantially horizontal.

11. The aircraft according to claim 10, wherein the turbomachine comprises fan vanes, which direction of rotation of the fan vanes is descending on the side of the fuselage, the first and second azimuthal positions θ1 and θ2, being defined by the following system of equations:

$$\frac{D_F}{2} - \frac{D_M}{2} - X_M \cos\theta_1 - Y_M \sin\theta_1 = 0$$

$$(X_{SL} - X_M)\cos\theta_2 + (Y_{SL} - Y_M)\sin\theta_2 + \frac{D_M}{2} = 0$$

where $X_M$ and $Y_M$ correspond respectively to the abscissa and to the ordinate of the center of the nacelle in the same three-dimensional reference frame whose center is located on the longitudinal axis of the fuselage, where $X_{SL}$ and $Y_{SL}$ correspond respectively to the abscissa and to the ordinate of a Sideline noise certification point in said three-dimensional reference frame, and where $D_F$ and $D_M$ are respective maximum diameters of the outer surfaces of the fuselage and of the engine.

12. The aircraft according to claim 10, wherein the turbomachine comprises fan vanes, which direction of rotation of the fan vanes is ascending on the side of the fuselage, the first and second azimuthal positions θ1 and θ2, being defined by the following system of equations:

$$-\frac{D_F}{2} - \frac{D_M}{2} + X_M \cos\psi_1 + Y_M \sin\psi_1 = 0$$

$$\theta_1 = \psi_1 + 180°$$

$$(X_{SL} - X_M)\cos\psi_2 + (Y_{SL} - Y_M)\sin\psi_2 - \frac{D_M}{2} = 0$$

$$\theta_2 = \psi_2 + 180°$$

where $X_M$ and $Y_M$ correspond respectively to the abscissa and to the ordinate of the center of the nacelle in the same three-dimensional reference frame whose center is located on the longitudinal axis of the fuselage, where $X_{SL}$ and $Y_{SL}$ correspond respectively to the abscissa and to the ordinate of a Sideline noise certification point in said three-dimensional reference frame, and where $D_F$ and $D_M$ are respective maximum diameters of outer surfaces of the fuselage and of the engine.

13. The aircraft according to claim 9, wherein the first and second acoustically porous parts extend along a portion of the annular inner wall and the annular outer wall, respectively, such that the first and second acoustically porous parts extend between the same first axial position and the same second axial position along the longitudinal axis of the nacelle and extend between the same first azimuthal position and the same second azimuthal position about said longitudinal axis, and wherein the first axial position is located at a lip of the nacelle, and the second axial position is aligned with a leading edge of a wing.

14. The aircraft according to claim 9, wherein the first and second acoustically porous parts extend along a portion of the annular inner wall and the annular outer wall, respectively, such that the first and second acoustically porous parts extend between the same first axial position and the same second axial position along the longitudinal axis of the nacelle and extend between the same first azimuthal position and the same second azimuthal position about said longitudinal axis, and wherein the first axial position is aligned with a trailing edge of a wing, and the second axial position is located at a downstream end of the nacelle.

* * * * *